US008700683B2

(12) United States Patent
Cooney et al.

(10) Patent No.: US 8,700,683 B2
(45) Date of Patent: Apr. 15, 2014

(54) METHOD AND APPARATUS FOR PROVIDING A KEY-VALUE BASED STORAGE INTERFACE

(75) Inventors: Geoffrey Thomas Cooney, Arlington, MA (US); Kenneth D. McCracken, Lexington, MA (US); Zane Zheng Yan Pan, Lexington, MA (US); Fujian Yang, Lexington, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/280,144

(22) Filed: Oct. 24, 2011

(65) Prior Publication Data

US 2013/0103729 A1 Apr. 25, 2013

(51) Int. Cl.
*G06F 7/00* (2006.01)
*G06F 17/30* (2006.01)

(52) U.S. Cl.
USPC .......................... 707/812; 707/827; 707/831

(58) Field of Classification Search
None
See application file for complete search history.

(56) References Cited

U.S. PATENT DOCUMENTS

| 6,173,293 | B1* | 1/2001 | Thekkath et al. ............... 1/1 |
| 6,332,163 | B1 | 12/2001 | Bowman-Amuah |
| 2010/0023524 | A1* | 1/2010 | Gladwin et al. .............. 707/10 |
| 2010/0082633 | A1 | 4/2010 | Harbarth et al. |
| 2011/0313973 | A1 | 12/2011 | Srivas et al. |
| 2012/0284317 | A1* | 11/2012 | Dalton ......................... 707/827 |

FOREIGN PATENT DOCUMENTS

WO  WO 2011/047474 A1  4/2011

OTHER PUBLICATIONS

MemcacheDB: http://memcachedb.org/, printed Jul. 13, 2012, 2 pages.
Rapolu et al., "Transactional Support in MapReduce for Speculative Parallelism", Mar. 3, 2010, Purdue e-Pub, Purdue University, Computer Science Technical Reports, Department of Computer Science, pp. 1-12.

* cited by examiner

*Primary Examiner* — Uyen Le
(74) *Attorney, Agent, or Firm* — Ditthavong Mori & Steiner, P.C.

(57) ABSTRACT

An approach is provided for implementing a virtual file system using a key-value-based storage interface. A key-value directory framework determines one or more files stored in at least one stream-based file store. The key-value directory framework causes, at least in part, a grouping of the one or more files into at least one key-value directory. The key-value directory includes, at least in part, one or more key-value pairs of a distributed key-value store. The key-value directory framework also causes, at least in part, a storage of (a) at least one identifier of the one or more files, the at least one key-value directory, or a combination thereof as one or more keys of the one or more key-value pairs; (b) block-based access information associated with the one or more files as one or more values of the key-value pairs; and (c) a locking mechanism to facilitate coordination of threads across multiple hosts.

20 Claims, 13 Drawing Sheets

METHOD AND APPARATUS FOR PROVIDING A KEY-VALUE BASED STORAGE INTERFACE

BACKGROUND

Service providers and device manufacturers (e.g., wireless, cellular, etc.) are continually challenged to deliver value and convenience to consumers by, for example, providing compelling network services. Important differentiators in the industry are application and network services as well as capabilities to support and scale these services. In particular, these applications and services can include accessing and managing rapidly increasing amounts of data, while also ensuring high degrees of reliability and availability. Accordingly, service providers and device manufacturers face significant technical challenges to optimizing data storage and access across large distributed storage systems.

SOME EXAMPLE EMBODIMENTS

Therefore, there is a need for an approach for providing a key-value based storage interface (e.g., a virtual file system using a key-value store) for distributed data storage systems (e.g., stream-based file stores) to enhance scalability, data replication, load distribution, availability, and the like.

According to one embodiment, a method comprises determining one or more files stored in at least one stream-based file store. The method also comprises causing, at least in part, a grouping of the one or more files into at least one key-value directory. The key-value directory includes, at least in part, one or more key-value pairs of a distributed key-value store. The method further comprises causing, at least in part, a storage of (a) at least one identifier of the one or more files, the at least one key-value directory, or a combination thereof as one or more keys of the one or more key-value pairs; and (b) block-based access information associated with the one or more files as one or more values of the key-value pairs.

According to another embodiment, an apparatus comprising at least one processor, and at least one memory including computer program code for one or more programs, the at least one memory and the computer program code configured to, with the at least one processor, cause, at least in part, the apparatus to determine one or more files stored in at least one stream-based file store. The apparatus also causes, at least in part, a grouping of the one or more files into at least one key-value directory. The key-value directory includes, at least in part, one or more key-value pairs of a distributed key-value store. The apparatus further causes, at least in part, a storage of (a) at least one identifier of the one or more files, the at least one key-value directory, or a combination thereof as one or more keys of the one or more key-value pairs; and (b) block-based access information associated with the one or more files as one or more values of the key-value pairs.

According to another embodiment, a computer-readable storage medium carrying one or more sequences of one or more instructions which, when executed by one or more processors, cause, at least in part, an apparatus to determine one or more files stored in at least one stream-based file store. The apparatus also causes, at least in part, a grouping of the one or more files into at least one key-value directory. The key-value directory includes, at least in part, one or more key-value pairs of a distributed key-value store. The apparatus further causes, at least in part, a storage of (a) at least one identifier of the one or more files, the at least one key-value directory, or a combination thereof as one or more keys of the one or more key-value pairs; and (b) block-based access information associated with the one or more files as one or more values of the key-value pairs.

According to another embodiment, an apparatus comprises means for determining one or more files stored in at least one stream-based file store. The apparatus also comprises means for causing, at least in part, a grouping of the one or more files into at least one key-value directory. The key-value directory includes, at least in part, one or more key-value pairs of a distributed key-value store. The apparatus further comprises means for causing, at least in part, a storage of (a) at least one identifier of the one or more files, the at least one key-value directory, or a combination thereof as one or more keys of the one or more key-value pairs; and (b) block-based access information associated with the one or more files as one or more values of the key-value pairs.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any originally filed claim.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a key-value based storage interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
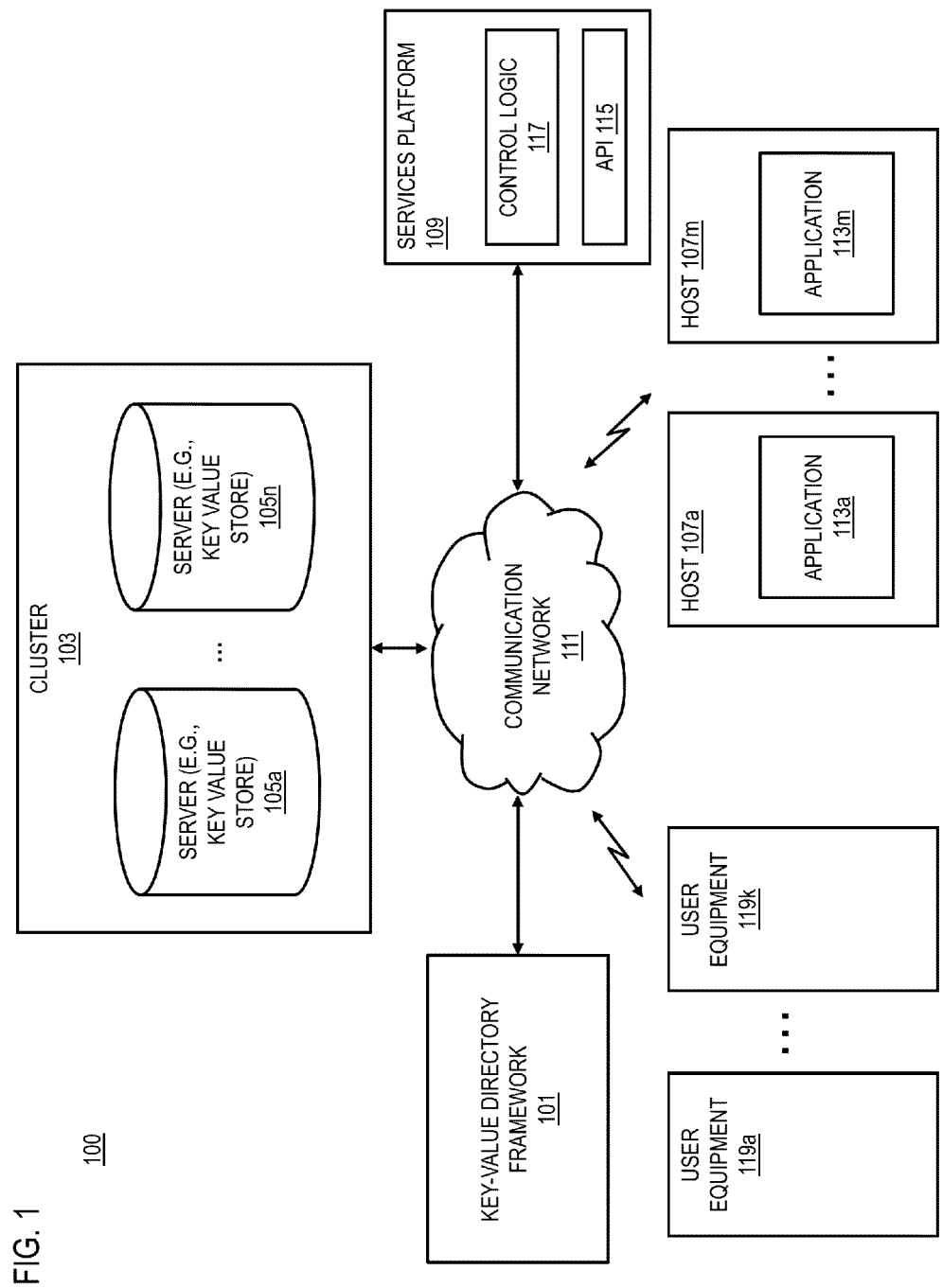
FIG. 1 is a diagram of a system capable of providing a key-value based storage interface, according to one embodiment.

FIG. 1 is a diagram of a system capable of providing a key-value based storage interface, according to one embodiment. With an increasing demand for network services (e.g., social networking services, media services, etc.), the need to properly manage access of data to users of the services is of growing concern. An integral part of such services is providing data to users while allowing for scalability and redundancy as the volume of data handled by the services increases. As a result, service providers have developed storage platforms (e.g., distributed storage platforms) capable of handling vast collections of large databases that store, for instance, information, data, etc. generated by any number of services (e.g., both integrated and individual services). Many of these databases can reach multiple terabytes, petabytes, or more in size. In some cases, storage platforms can additionally split larger databases into smaller databases (e.g., partitions or database shards) maintained at multiple nodes to allow for the scalability and/or redundancy noted above.

One example of a distributed storage platform is a distributed key value store (e.g., a Voldemort-based key-value storage system as described at http://project-voldemort.com/design.php, last accessed Oct. 23, 2011, which is incorporated herein in its entirety) which given a key returns as corresponding value. In one embodiment, key-value stores are an alternative data storage mechanism to traditional relational databases. By way of example, key-value stores provide schema free storage of data as a mapping of keys to underlying data values. This schema free property enables, for instance, key-value stores to store practically any type of data include stream-based storage of files whereby individual bytes or blocks of data can be stored in key-value pairs. In some embodiments, due to hashing, data storage and retrieval are typically very fast in key-value stores. Moreover, a distributed key-value store is a key-value storage system that writes each data point to multiple nodes to minimize read/write time while protecting against data loss. By writing and reading from multiple nodes, distributed key-value stores can avoid waiting for any single read/write to complete and mitigate against a slow or unavailable resource from slowing down or compromising the availability of the entire system. In some embodiments, the key value store can implement an Optimistic Concurrency Control (e.g., Zookeeper) mechanism to avoid concurrent updates to the same key.

At the same time, service providers have developed corresponding computing platforms capable of executing applications or other processes for efficiently processing the potentially vast quantities of data stored within such distributed storage platforms. In some embodiments, these computing platforms can provide for parallel or distributed computing across multiple computing nodes. By way of example, the distributed computing platform may operate using a parallel processing framework (e.g., an Apache Hadoop framework as described at http://hadoop.apache.org/#What+Is+Hadoop%3F, last accessed Oct. 23, 2011, which is incorporated herein in its entirety) that supports execution of distributed applications for processing large databases via potentially thousands of computing nodes. Such a framework can be based on, for instance, a Map Reduce paradigm (e.g., as described at http://hadoop.apache.org/mapreduce, last accessed Oct. 23, 2011, which is incorporated herein in its entirety) for parallel processing whereby a master node partitions a job or task among multiple subordinate computing nodes and then aggregates the results from the subordinate computing nodes to arrive at a "reduced" result. For example, the subordinate computing nodes can then perform a "map" function on their respective portions of the jobs to process an input and generate a result or output.

Within a context a combined system whereby a distributed computing or processing platform interacts with a distributed storage platform to process large amounts of data, it is often the case that large amounts of data are transferred from the storage platform for processing at the distributed computing platform. For example, such a system can include a full-text search system. In full-text search systems, performing keyword searches by individually scanning each of the documents or files can become prohibitively expensive (e.g., in terms of computational resources, bandwidth resources, etc.)

as the number of files or documents becomes large. To solve this problem, most large-scale search systems build an inverted word index. This inverted word index maps terms from the corpus to individual documents containing each term, and optionally includes frequency counts, positions, etc. This index is built as new documents are added and is written to some form of permanent storage, usually a local disk. Search is then, for instance, performed against the prebuilt index, instead of directly against the documents.

One implementation of such an index is Lucene, a popular Java implementation of an indexed full-text search system (e.g., as described at http://lucene.apache.org, last accessed Oct. 23, 2011, which is incorporated herein in its entirety). However, some of the biggest technical hurdles for Lucene-based indices are providing horizontal scalability and data replication to, for instance, distribute request load and protect against server failure. Moreover, because most Lucene-based systems are stored on local file systems, there often is a necessity for an independent process to manage copying data between different hosts or machines. Because any given search usually requires access to the entire index, this means that every server or host that needs to support search also needs to maintain an up-to-date copy of the index. Accordingly, service providers face significant challenges to reducing the resource burden associated with data-intensive applications implemented in distributed computing platforms and distributed storage platforms (e.g., an Apache Solr based system).

To address these problems, a system 100 of FIG. 1 introduces the capability to provide stream-based access to virtual files (e.g., files stored in a non-structured stream-based file store such as a distributed key-value store) with a virtual file system that is itself implemented in a key-value storage system (e.g., a distributed key-value storage system). By way of example, the key-value storage system of the virtual file system may be part of the same file store in which the virtual files are stored. In other embodiment, the two storage systems can be separate.

Various embodiments of the approach described herein are based on a Lucene directory implementation, and is used to drive indexing and searching content in Lucene via a "key-value directory." It is contemplated that the system 100 can also be used to provide a generic block-storage interface using a key-value store. In one embodiment, the key-value directory framework 101 implements a virtual file system in which a key-value directory includes an index of its content in the form of key-value pairs of distributed key-value store. For example, a key-value directory stores indices of files (e.g., stored in a distributed file store such as the cluster 103 of one or more store servers 105a-105n) contained therein as keys corresponding to files as segmented into blocks for quick access. Because, of the scalability of key-value stores, the key-value directory framework 101 can support potentially millions, billions, or more of indices (e.g., with high privacy controls). The number of indices available to the key-value directory framework 101 is limited only by available system 100 resources and not by the architecture of the framework.

In some embodiments, key-value directory index files are broken up into smaller buckets or blocks to enable quick retrieval of individual sections without having to read the entire index file. In some embodiment, contents (e.g., files, subordinate directories, etc.) of the key-value directory are maintained in separate key-value pairs in the cluster 103. In some embodiments, the system 100 supports indexing and searching across multiple machines or hosts 107a-107m (also collectively referred to as hosts 107). Because the key-value directory data are stored remotely (e.g., in the key-value directory framework 101 and/or the cluster 103), the system 100 is completely horizontally scalable for searching. In other words, the system 100 relies on the distributed key-value store of the key-value directory framework 101 to provide fault-tolerance, replication, high availability, and high throughput. For example, application instances of the hosts 107 can run with stateful or stateless routing. Loss of a host 107a simply means another host 107m can receive file operation requests and perform the data reads, writes, etc. together with associated computes, before responding to clients. Although the system 100 can support use of intelligent routing of requests from applications (e.g., applications 113a-113m) executing in the hosts 107, any instance of a particular application can pick up any request and interact with the key-value directory framework 101 to perform the requested operation.

In one embodiment, the files or documents indexed by the system 100 are stored in the cluster 103 in various block sizes to facilitate block-based access and support random access to different locations within the files. For example, via block-based access, a location in a file can be described by a block number and an offset to the location within the given block (as described in more detail with respect to FIG. 5 below). The block sizes can be tuned or selected based on various system parameters such as resource availability, file sizes, file types, etc.

In some embodiments, the system 100 also provides for caching of the data from the cluster 103 to the hosts 107 or the key-value directory framework 101. Specifically, the system 100 can use in-memory caching to queue up batches of writes (or other file operations such as read operations) to many blocks within the files during large sequential writes or operations to a key-value directory's underlying output stream (e.g., file block locations associated with requested file operations). The system 100, for instance, initiates the generation of the output stream in response to receiving a request specifying write, read, and/or other operations. Examples of file operations in the context of a key-value directory are described in more detail with respect to FIGS. 4 and 5 below.

In another embodiment, the system 100 also provides for a locking mechanism (e.g., exclusive locks) when performing operations on the output stream of a key-value directory. For example, before performing an operation, the system 100 can attempt to obtain an exclusive lock on the file blocks identified by the key-value directory. The exclusive lock may have a timeout period or limited duration (e.g., 30 seconds) which can be renewed or maintained using, for instance, a heartbeat signal. If another process or thread already has an exclusive lock, the system 100 may determine whether to delay (e.g., until a lock is available; or reserve a lock for a future time), verify the existing lock (e.g., determine whether the lock has not expired), and/or override the existing lock. The locking mechanism is discussed in more detail with respect to FIG. 6 below.

As shown in FIG. 1, hosts 107a-107m have connectivity to the key-value directory framework 101, the cluster 103, the storage servers 105, and a service platform 109 via a communication network 111 to request file operations (e.g., read, write, delete, update, etc.) using one or more key-value directories in support of various functions and/or services. In one embodiment, respective applications 113a-113m (also collectively referred to as applications 113; e.g., a services application, a map application, a social networking application, etc.) of the hosts 107 can request such services via an application programming interface (API) 115 of the services platform 109. Control logic 117 of the services platform 109 receives such requests and utilizes the key-value directory framework 101 in conjunction with at least one cluster 103 of the servers 105, such as a distributed key value store, to provide services and related data to the applications 113. In one embodiment, the hosts 107 can in turn relay or provide the services to one or more user equipment (UEs) 119a-119k (e.g., terminals or other client devices such as smartphones, personal computers, etc.; also collectively referred to as UEs 119). It is also contemplated that at least a portion of the data stored in the cluster 103 may be shadowed or cached in the hosts 107, the UEs 119, the services platform 109, or other component of the system 100 to, for instance, reduce latency, increase reliability, increase availability when the cluster 103 is offline, etc. Although the key-value directory framework 101 is depicted as a separate component of the system 100, it is contemplated that the key-value directory framework 101 may be incorporated as a module of any other component of system 100.

The cluster 103 may consist of one or more databases that can be structured utilizing one or more systems. As noted above, the databases of the cluster 103 and/or servers 105 can be a distributed key value store. In certain embodiments, a distributed key value store allows for the storage of values by key. The value itself can be a corpus or body of information that need not be structured. An index of keys can be generated to search for keys that may be useful to users. The key can then be retrieved and sent to a client system via the key-value directory framework 101. Although various embodiments are described with respect to the key value store, it is contemplated that the approach described herein may be used with other databases (e.g., a distributed database under the control of a database management system, where the storage devices are not all attached to a common processor or a non-distributed database). Key based storage can additionally be useful for social services (e.g., where the key is tied to a user profile), user sessions, shopping carts (e.g., where the key is for a shopping selection for an account of the user), or the like. In some embodiments, the cluster 103 and/or servers 105 can include one or more shards and/or horizontal partitioning systems. In certain embodiments, horizontal partitioning is a database where rows of a database table are separated instead of separating by columns. Each partition/separation can constitute a shard. The shards can further be partitioned by one or more rows.

By way of example, the communication network 111 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 119 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 119 can support any type of interface to the user (such as "wearable" circuitry, etc.).

By way of example, the key-value directory framework 101, the cluster 103, the servers 105, the hosts 107, the services platform 109, and the UEs 119 communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Further, communications between the key-value directory framework 101, the cluster 103, and/or the hosts 107 can be performed via one or more of the aforementioned protocols and/or technologies. Further, fast connections (e.g., gigabit Ethernet, fiber channel, etc.) can be utilized among the any of the components of the system 100.

In one embodiment, the key-value directory framework 101, the cluster 103, the hosts 107, the services platform 109, and/or the UEs 119 may interact according to a client-server model. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
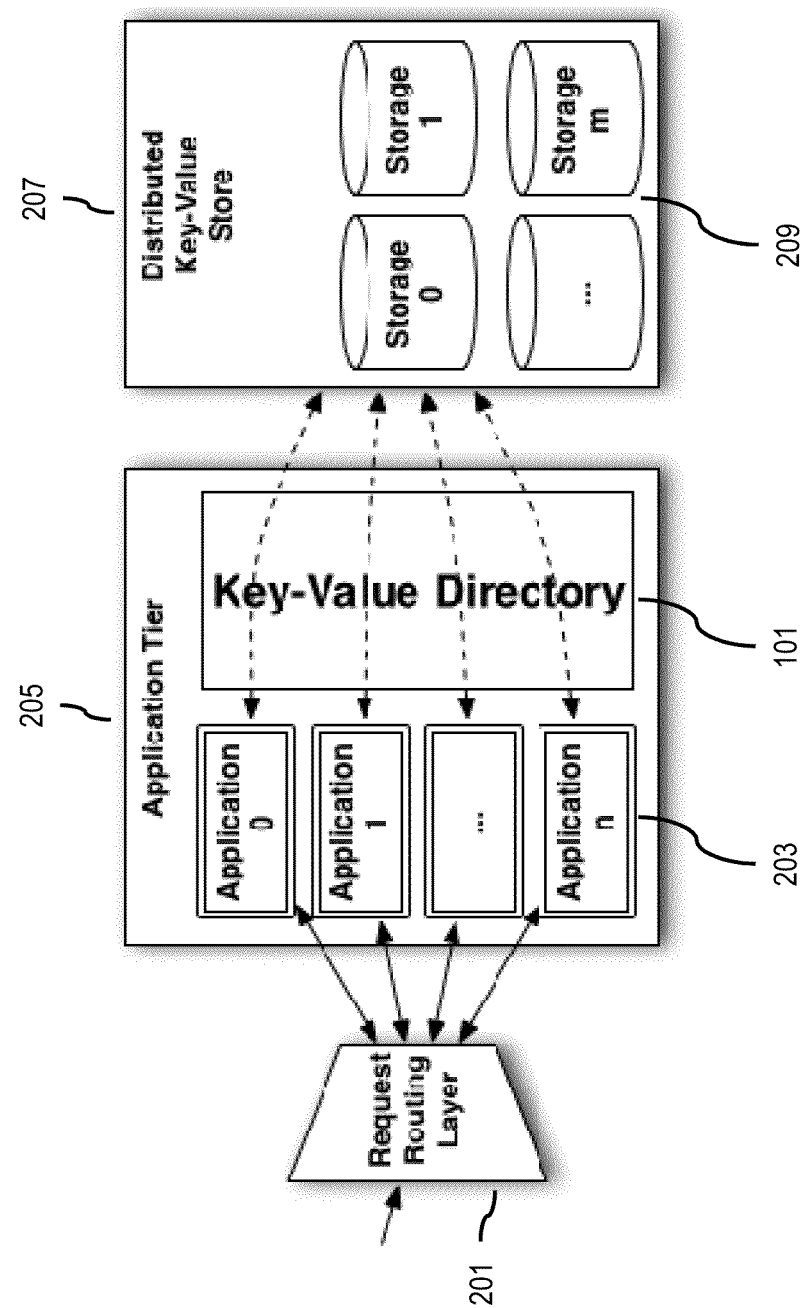
FIG. 2 is a diagram of an overview of a key-value directory for interfacing with a distributed file store, according to one embodiment.

FIG. 2 is a diagram of an overview of a key-value directory for interfacing with a distributed file store, according to one embodiment. In one embodiment of the system 100, a request routing layer 201 receives incoming requests (e.g., service requests such as queries, file operations, etc.) and routes the requests to any application node 203 operating within the application tier 205. In one embodiment, the requests may originate from clients such as the UEs 119. The application nodes 203 then pass any file related operations associated with the requests to the key-value directory framework 101.

As described above, the key-value directory framework 101 provides a storage interface between the applications nodes 203 and the distributed key value store 207 (e.g., a cluster 103) comprising one or more storage systems 209. As a storage interface, the key-value directory framework 101 enables the application nodes 203 to interact with files or documents stored in the distributed key-value store 207 via a virtual file system that provides a directory overlay on top of otherwise stream-based or unstructured file data. More specifically, the key-value directory framework 101 defines virtual directories (e.g., a key value directory) that organizes or groups files and provides an index of pointers to any file or location within the file. Because, the key-value directory framework 101 stores this virtual file system structure in a distributed key-value store just like the underlying file data, the key-value directory and its indices are not subject to limitations of the local hosts 107 (e.g., available only locally, subject to synchronization requirements among hosts 107, limited in size, etc.).

In addition, the block-based access provided by the key-value directory framework 101 enables quick and random access to specific locations within a file. As described in more detail below, block-based access enables the key-value directory to determine specific locations of a file within the distributed key-value store by identifying a particular file block and then an offset within the file block to locate the points in the files associated with a particular service request.

Figure 3:
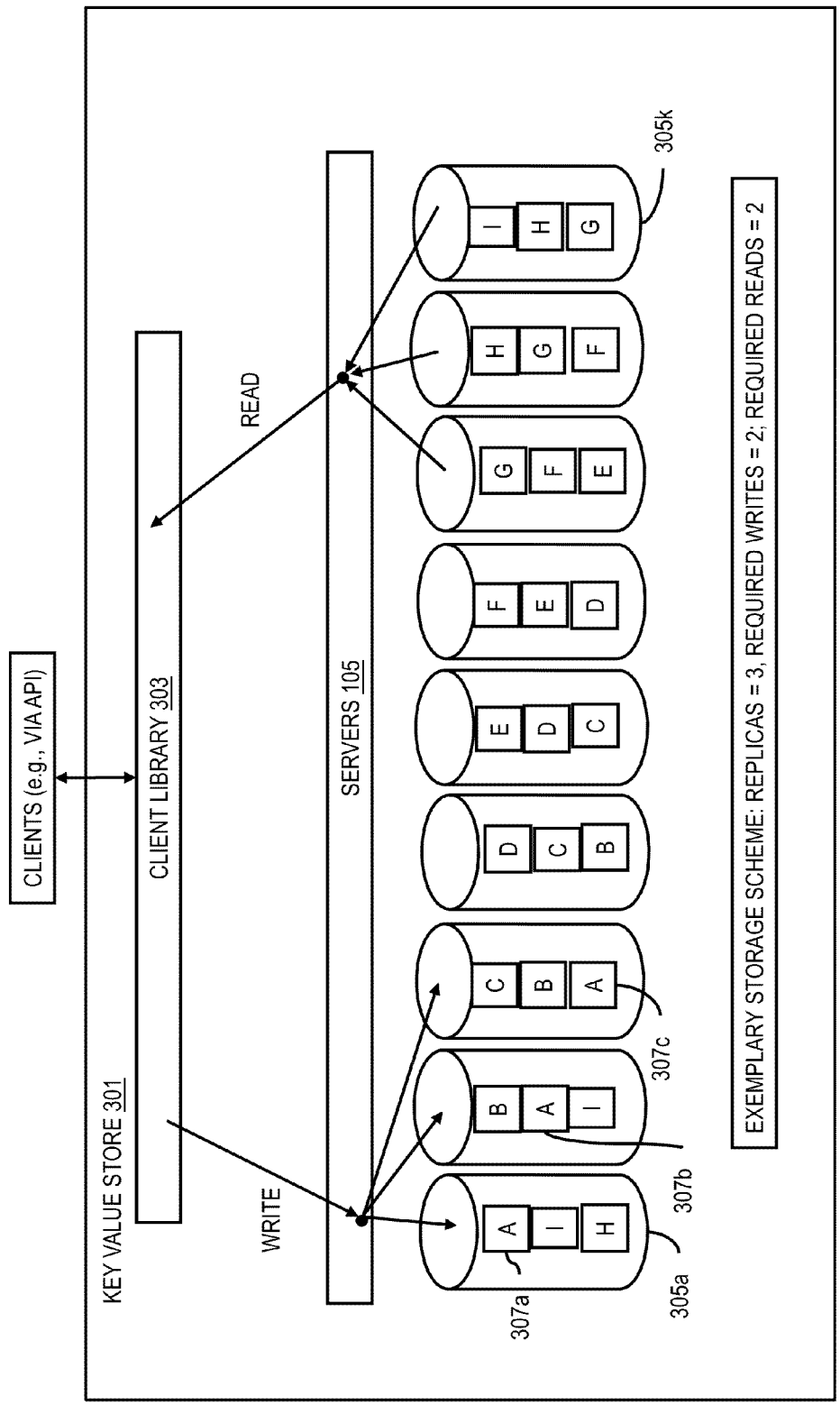
FIG. 3 is a diagram of the components of a distributed file store, according to one embodiment.

FIG. 3 is a diagram of the components of a distributed file store, according to one embodiment. In one embodiment, the key-value directory generated by the key-value directory framework 101 and/or the files associated with the key-value directory are key-value stores (e.g., a key value store 301) that include one or more components for providing storage of data that can be indexed, stored, retrieved, and searched as discussed with respect to the various embodiments described herein. As shown in the example of FIG. 3, the key value store 301 includes one or more components for providing storage of data that can be indexed, stored, retrieved, and searched. In certain embodiments, the key value store 301 includes data stored utilizing keys. Further, the key value store 301 can be distributed (e.g., stored using one or more clusters 103 and/or servers 105 at one or more locations). It is contemplated that the functions of these components may be combined in one or more components or performed by other components of equivalent functionality. It is further contemplated that other forms of databases may be utilized in place of or in addition to the key value store 301. In this embodiment, the key value store 301 includes a client library 303 that may be used to communicate with servers 105, and databases 305a-305k (also collectively referred to as databases 305) stored on the servers 105.

The control logic 117 and/or API 115 may communicate with the key value store 201 using a client library 303. In certain embodiments, the key-value directory framework 101, the hosts 107, the services platform 109, the applications 113, the API 115, the control logic 117, and/or the UEs 119 may be considered clients receiving database services from the key value store 301. The client library 303 may include an interface that can determine which servers 105 to communicate with to retrieve content from databases 305. In certain embodiments, databases 305 are stored utilizing a key and value mechanism that allows storage using the key. A portion (e.g., a partition, a shard, etc.) of each database (e.g., portions A-I as depicted in FIG. 3) can be linked to a key. In one embodiment, the key is hashed to determine which portion the key is linked to. A key may be hashed using a ring method, for example. Using the ring, each key and portion may be hashed to a primary location (e.g., based on a key with an identifier that is hashed into a number k) as well as one or more backup locations. The backup locations may be locations associated with the next server or host associated with the hash. The client library 303 determines which servers 105 to read and write information from and to using the key hashes. The client library 303 and the servers 105 may each include a lookup table including which portions belong to which servers 105. In one embodiment, the key-value directory framework 101 can use a normalized identifier (e.g., a concatenation of a directory name, file name, delimiters, and/ or other identifiers) to specify the key without using a hash function.

In certain embodiments, the portion (e.g., portion A 307a-307c) may be stored using multiple servers over multiple databases 305. In one implementation, portions may be replicated over n number (e.g., replicas=3) of servers 105 and databases 305 for redundancy, failover, and to reduce latency. Moreover, the portions may be written to and read from at the same time by the client library 303. When reading from the databases 305, the client library 303 may determine if there are any consistency issues (e.g., portion 309a does not match portion 309b) via, for instance, a merge and/or repair operations. In addition or alternatively, one or more clients of the key value store 301 (e.g., hosts 107, the services platform 109, UEs 119, etc.) may performed the consistency determination and initiate the merge and/or repair operations. Moreover, in certain embodiments, an example storage scheme may require that when performing a write or a read, at least a certain number (e.g., required writes=2, required reads=2 etc.) of portions need to be successfully written or read. This allows for redundancy and quorum consistency. If a database 305a fails or is otherwise incapacitated, a portion 309a associated with the database 305a may be later updated with content it should include by servers 105 having replicated portions 309b, 309c.

The API 115 may request that a key based data structure may be stored in the key value store 301. The new data structure may be assigned a key based, at least in part, on an associated account identifier associated. Then, the key may be hashed to determine a portion (e.g., portion A 209) to store the new data structure in. As discussed above, in the context of a key-value directory, a file/directory identifier may be used in place of a hash as the key. Next, the data structure is stored in a primary database as well as in backup databases (e.g., replica databases). The profile may be considered a value associated with the key. To retrieve the data structure at a later time, the hash of the key may be used to request the data structure from the server 105 associated with the portion. Then, the key may be utilized to search the portion for the data structure.

The key value store 301 is an example of a particular database structure that can be utilized in providing a key-value directory. It is contemplated that other types of database structures, for example, other key value stores, other databases, other shard databases, other partition based databases, etc. can be utilized provide a block-based storage interface.

Figure 4:
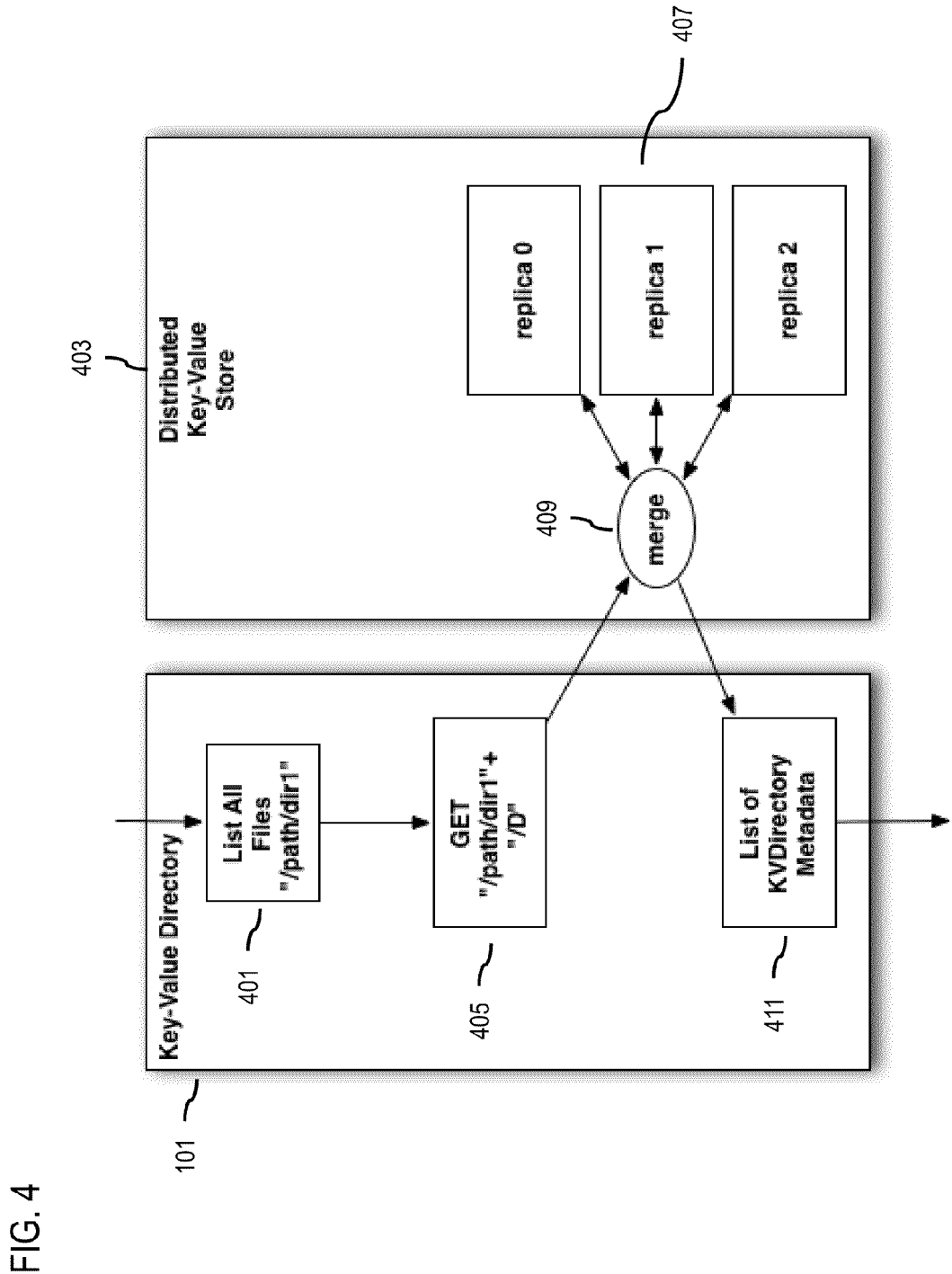
FIG. 4 is a diagram of a request to list files in a key-value directory, according to one embodiment.

FIG. 4 is a diagram of a request to list files in a key-value directory, according to one embodiment. The example of FIG. 4 describes an example of the key-value directory framework processing a request to list all files within a particular key-value directory. In this case, a directory storage interface of the key-value directory framework 101 receives a request 401 to list all files in a key-value directory named "/path/dir1". The key-value directory framework 101 then constructs a key by postfixing, a "/D" to the directory name (e.g., "/path/dir1/D"). It is contemplated that the choice of delimiter character '/' could be replaced with another suitable character. Because the same key or identifier generation process is used to initially create the directory, the key-value directory framework 101 can directly retrieve the key-value directory information from the distributed key-value store 403 by routing a command 405 specifying the key (e.g., "GET '/path/dir1/D'") to the distributed key-value store 403.

On receiving the command 405, the distributed key-value store 403 retrieves the replicas 407 of the data block representing the beginning of the list of all files in the requested key-value directory (e.g., using various embodiments of the block-based approach described herein). The distributed key-value store 403 can then perform a merge operation 409 to read-repair any discrepancies among the replicas before returning the results (e.g., the list 411 of key value directory metadata) to the key-value directory framework 101.

In one embodiment, updates to the file contents within a given key-value directory can be initiated using a command (e.g., "flush( )") to update the appropriate data blocks in the distributed key-value store 403 with the new metadata for the updated files. In certain embodiments, all or a portion of the key-value directory metadata may be cached to improve performance.

Figure 5:
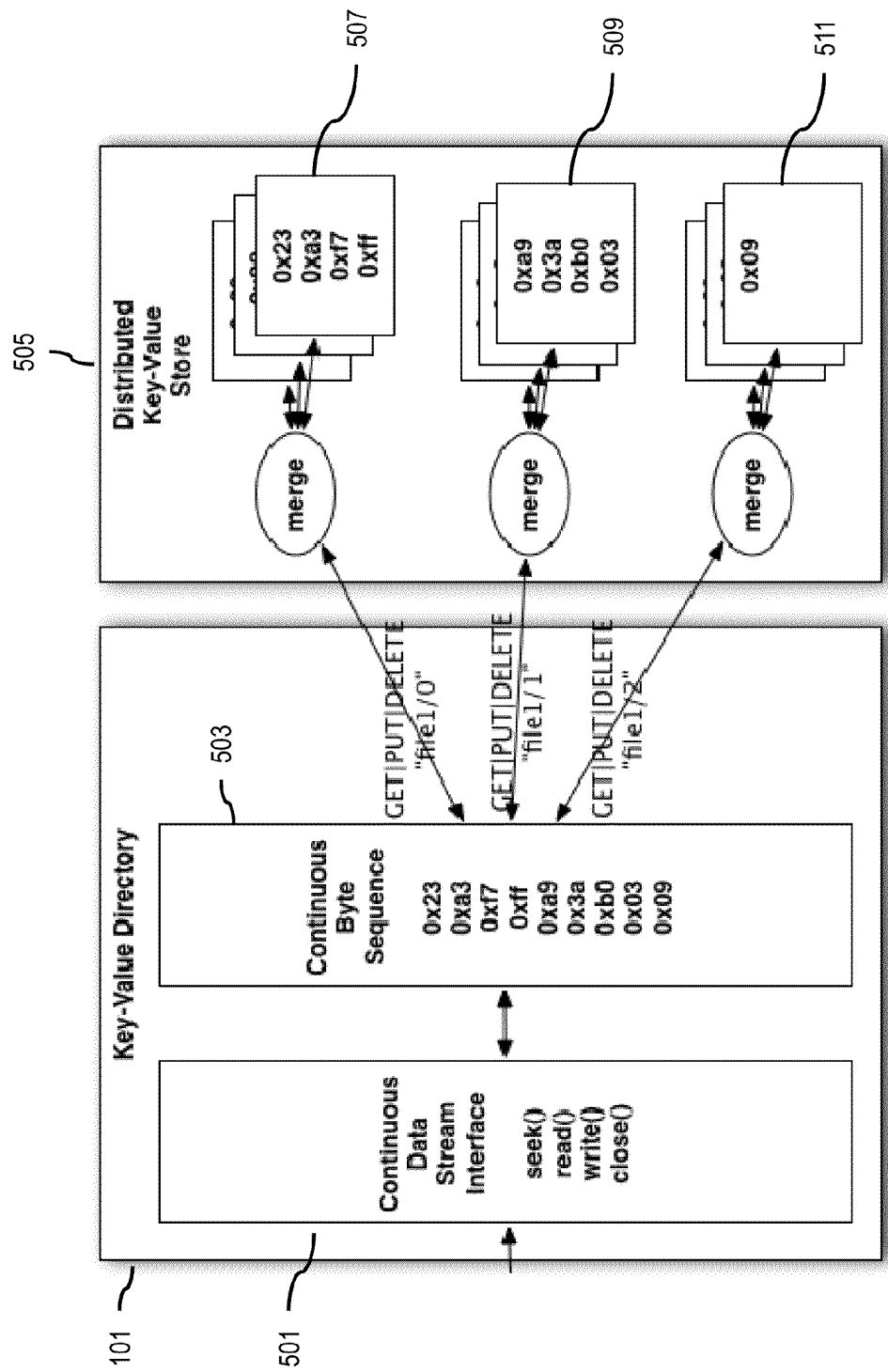
FIG. 5 is a diagram of a stream interface of a key-value directory, according to one embodiment.

FIG. 5 is a diagram of a stream interface of a key-value directory, according to one embodiment. In one embodiment, the key-value directory framework 101 includes, at least in part, a continuous data stream interface 501 that supports various file operations such as seek( ), read( ), write ( ), close( ), etc. The example of FIG. 5 uses hexadecimal as an example notation for a file 503 containing continuous byte sequence of 9 data bytes. In this example, the key-value directory framework 101 is configured with a block size of 4. As a result, on initial storage in the distributed key-value store 505, the key-value directory framework 101 writes the 9 data bytes into three data blocks (e.g., a block 507 including the first four bytes, a block 509 including the second four bytes, and a block 511 including the last byte) and stores pointers or an index to the blocks in a key-value directory. In one embodiment, the key associated with each block 507-509 is named according to the name of the file 503 and a corresponding block number. For example, if file 503 is named "file 1", the keys of the corresponding blocks are: block 507="file 1/0", block 509="file 1/1"; and block 511="file 1/2"). In certain embodiments, as part of the write operation, the distributed key-value store 505 creates three replicas of each data block 507-511.

After writing the file 503, if a request is received to seek to offset 5 then read one byte of the file 503, the key-value directory framework 101 can determine a key by concatenating the file name and with the computed block information. For a block size of 4, as in this example, the block that encompasses offset 5 is "file 1/1". Block "file 1/1" is retrieved via a "GET /file 1/1" command from the distributed key-value store 505. Internally, the distributed key-value store 505 merges reads from each of the three replicas of block "file 1/1", performing read-repairs if needed. The returned data block has the bye sequence 0xa9 0x3a 0xb0 0x03. From that, the block offset 1 (e.g., computed as the current ready position modulus block size (4)) is used, and the byte 0x3a is returned.

Other file operations may be similarly performed. For example, as described above, data may also be written via a write to the file stream 503, and a "PUT" to the distributed key-value store 505. In one embodiment, any file operation (e.g., PUT or DELETE) to the distributed key-value store 505 also updates the file's metadata portion in the key-value directory metadata (e.g., update to a "lastModified" and/or "lengthOfFile" metadata fields). In some embodiments, file operations maybe batched to operate on larger byte streams, and/or can be cached locally for performance.

Figure 6:
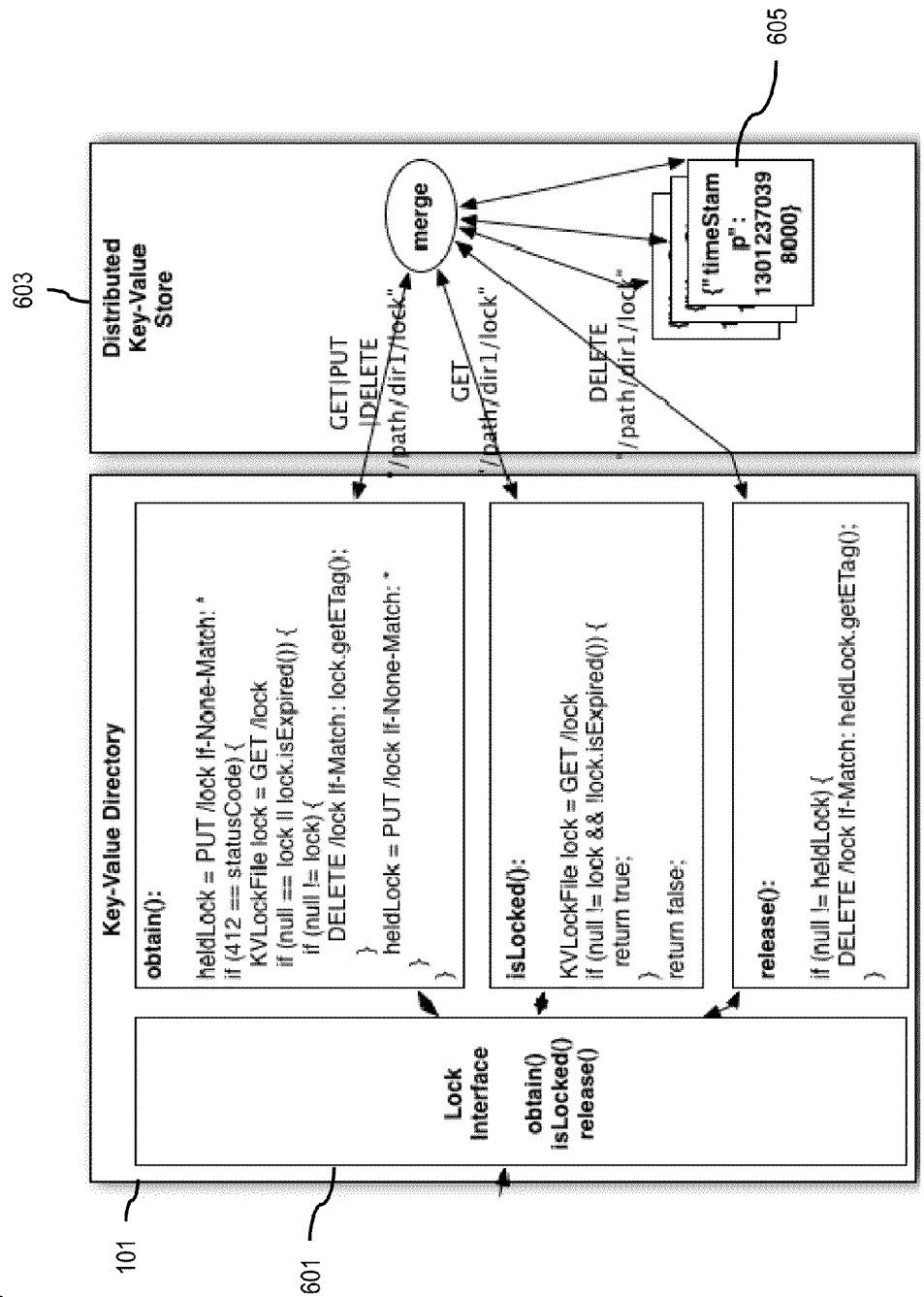
FIG. 6 is a diagram of a locking mechanism within the context of a key-value directory, according to one embodiment.

FIG. 6 is a diagram of a locking mechanism within the context of a key-value directory, according to one embodiment. As shown, FIG. 6 provides pseudocode for describing a locking mechanism when performing file operations associated with the key-value directory framework 101. In one embodiment, the key-value directory framework 101 provides a lock interface 601 that can be used for isolation of threads on host applications 113 operating on the files in the distributed key-value store 603. In certain embodiments, the lock interface 601 incorporates use of the ETag-protection (e.g., a described in the Internet Engineering Task Force (IETF) Request for Comments: 2616, available at "HTTP://www.ietf.org/rfc/rfc2616.txt", last accessed Oct. 23, 2011, incorporated herein in its entirety).

In one embodiment, the lock interface 601 provides three operations: "obtain( )", "isLocked( )", and "release( )". As shown, the obtain( ) semantics is for obtaining the named lock if no other entity holds the lock, or if the holder's lease on the named lock is expired. By way of example, the holder's lease is determined by a comparison of the timestamp document 605 (e.g., an HTTP document whose content is shown as {"timestamp":130112370498000}) that an existing holder wrote to the named lock data to, for instance, the local system clock. The comparison can then be used to determine whether the lock has expired (e.g., extended beyond the lease duration). In one embodiment, the lease duration is configurable and can be extended or maintained by a heartbeat mechanism or signal to refresh the lock's timestamp periodically for a long file operation (e.g., a long write operation).

If the obtain( ) call is successful, isLocked( ) can be used to verify that the lock is still available by determining whether any other entity has written a non-expired lock since the obtain( ) was performed. This serves as a check to avoid file consistency or integrity issues in the event that the there is a significant time gap between the obtain( ) call and any subsequent file operation.

In one embodiment, once the file operation is complete, release( ) deletes the held lock if currently held by the current thread. In some embodiments, ETag protection via, for instance, the If-Match header is used to delete only if no other entity has subsequently stolen or seized the lock from the current thread.

It is contemplated that the locking mechanism or lock interface 601 can be used at the virtual directory or virtual file level provided by the key-value directory framework 101.

Although the example of FIG. 6 is described with a lock based on timestamp information (e.g., enabling seizing of locks based on lease expiration), it is contemplated that the system 100 may use any other parameter or criteria for determining when to allow seizing or invalidating and existing lock. For example, information such as thread priority of the lock holder may be used, wherein threads of higher priority may seize the locks from threads of lower priority.

In some embodiments, the lock interface 601 can enable advance reservations of lock periods. For example, if a data block is currently locked, the current thread can request a reservation of the lock for the next or other subsequent lease period. In one embodiment, the current lock holder may be informed of a pending reservation and may be given an opportunity to immediately surrender the lock, allow the lock to expire as scheduled, or to extend the lock.

In another embodiment, if a current thread has decided to seize or override a current lock holder, the seizing entity may provide sufficient time to the current holder to finish any pending operations before initiating the seizure.

Figure 7:
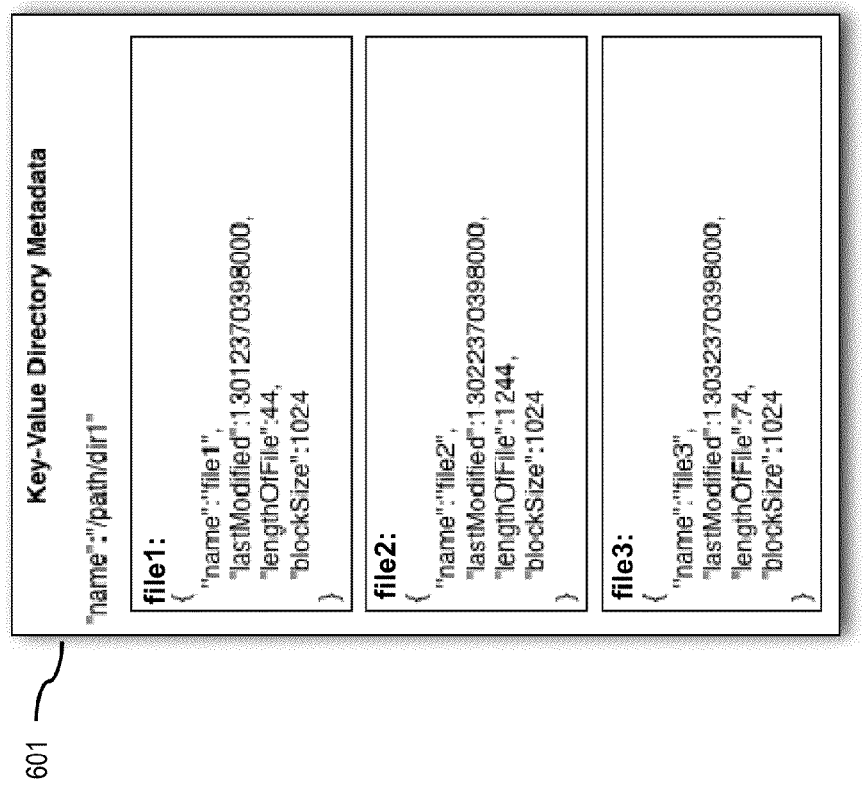
FIG. 7 is a diagram of metadata associated with a key-value directory, according to one embodiment.

FIG. 7 is a diagram of metadata associated with a key-value directory, according to one embodiment. More specifically, FIG. 7 shows an example of key-value directory metadata that can be used to respond to the list all files operation described with respect to FIG. 4 above. In this example, the key value directory is named "/path/dir1", and has three files named "file1", "file2", and "file3". Each of the three files metadata fields includes a "lastModified" timestamp, a "lengthOfFile", and a "blockSize". By way of example, the "lastModified" field can tell a reader if a file's contents have changed since the last time the reader accessed the file. The "lengthOfFile" can tell both a reader and a writer how many bytes are currently in the file. The "blockSize" provides the consistent splitting of the file into blocks. For example, "filet" 1244 bytes long, and because it has a blockSize of 1024, the system 100 computes that the file occupies 2 blocks. The address of those blocks in the distributed key-value store 403 are "/path/dir1/file2/0" and "/path/dir1/file2/1".

In one embodiment, the key-value metadata may itself be split into blocks as its size grows. In addition, it is contemplated that any other metadata field associated with the virtual file may be included (e.g., owner, access rights, privacy settings, etc.).

Figure 8:
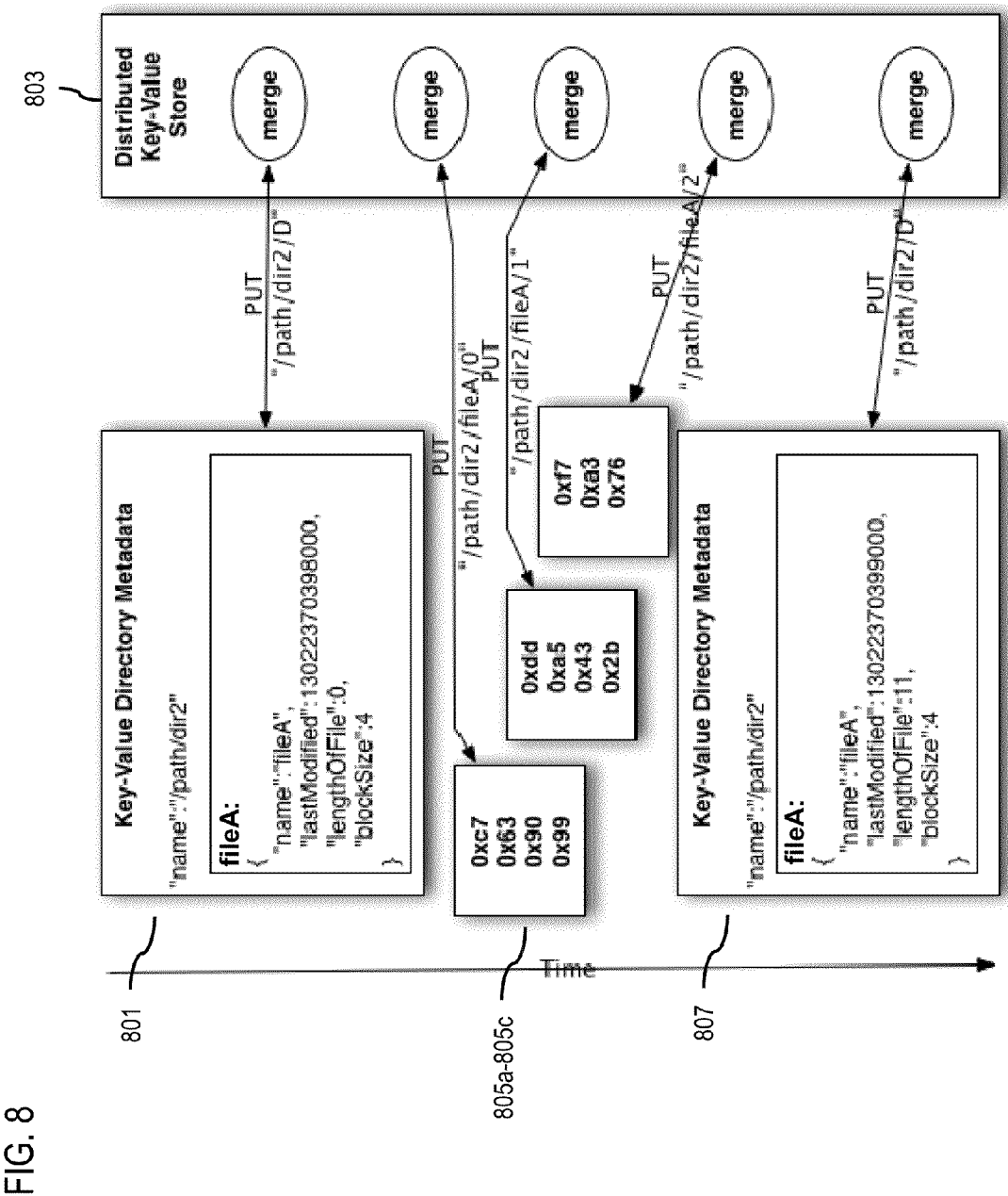
FIG. 8 is a diagram of a key-value metadata acting as a commit point for a file write operation, according to one embodiment.

FIG. 8 is a diagram of a key-value metadata acting as a commit point for a file write operation, according to one embodiment. As shown, FIG. 8 depicts an example of writing 11 bytes to a new virtual file in a virtual key-value directory. As discussed previously, the key-value directory metadata contains the information about the contents of the directory (e.g., a list of files and their locations). When a file "fileA" is added, the system 100 first writes the key-value directory metadata 801 containing "fileA" to the distributed key-value store 803. In FIG. 8, writes are shown as "PUT" arrows, and the "merge" operation occurs as described previously. For clarity, the replicas within the distributed key-value store 803 are not shown, but are nonetheless maintained by the distributed key-value store 803.

The 11 bytes are divided into three blocks (e.g., blocks 805a-805c) with a block size of 4 bytes. Suppose the blocks 805a-805c of 11 bytes have been written to an in-memory buffer, and on flush( ), they are "PUT" to the distributed key-value store 803 in parallel. Upon success, the comment point for this content is written out, by rewriting the key-value directory metadata 807 for "fileA" with "lengthOfFile" 11 and an updated "lastModified" timestamp.

In one embodiment, the system 100 can optionally obtain( ) an exclusive write lock before the write operation, and release( ) it after the operation is complete. In one embodiment, readers will not honor the new data until "lengthOfFile" has been increased and becomes readable. In addition, deleting (or truncating) a file also deletes all appropriate blocks that may have been previously written without reaching the commit point. If the buffer for block writing has a capacity C, a request to delete "fileA" will also delete all blocks that cover the current "lengthOfFile" plus C blocks, due to possible writes that did not reach their commit point.

Figure 9:
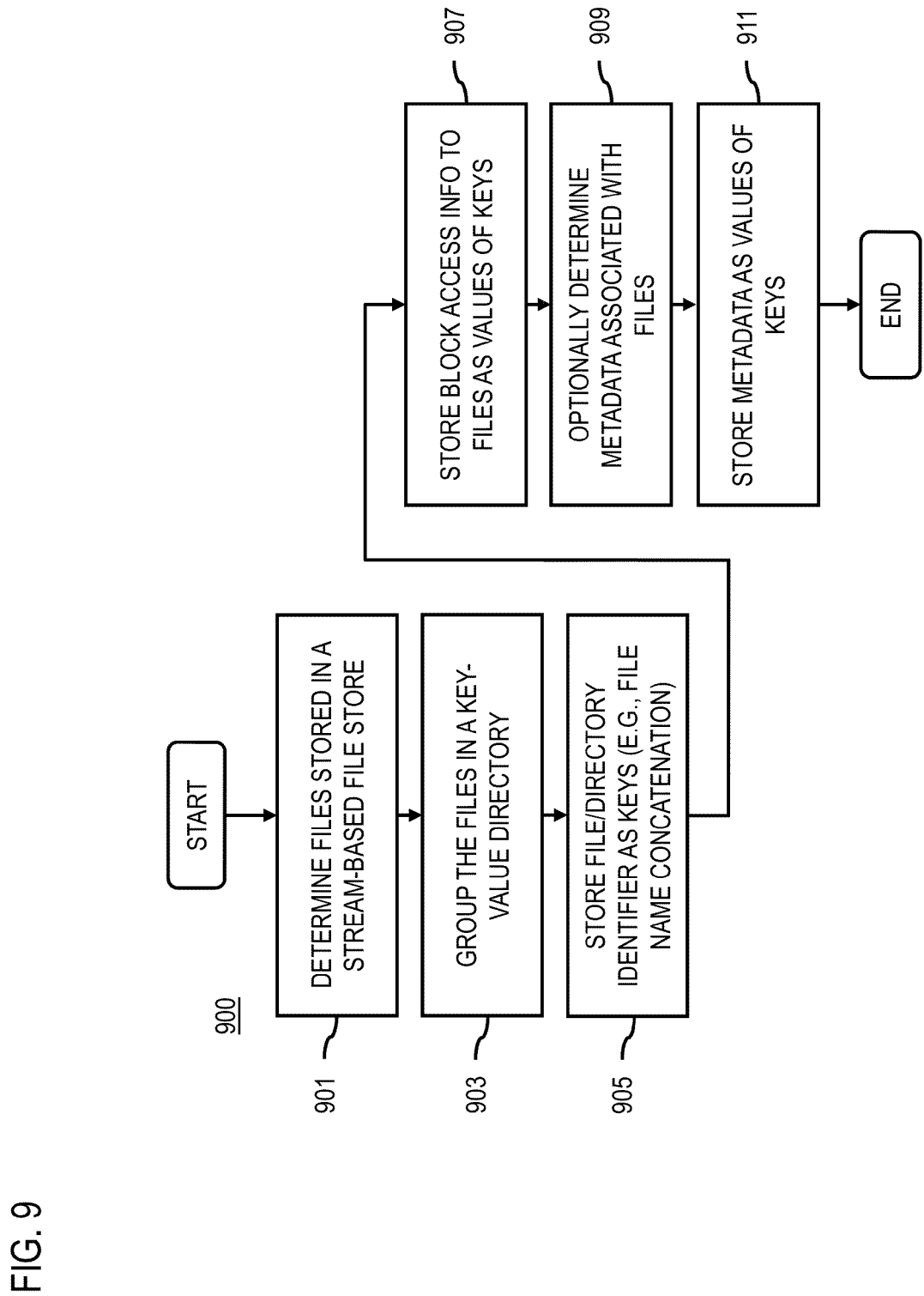
FIG. 9 is a flowchart of a process for creating a key-value directory, according to one embodiment.

FIG. 9 is a flowchart of a process for creating a key-value directory, according to one embodiment. In one embodiment, the key-value directory framework 101 performs the process 900 and is implemented in, for instance, a chip set including a processor and a memory as shown FIG. 12. In step 901, the key-value directory framework 101 determines one or more files stored in at least one stream-based file store. In some embodiments, the file-store may be empty and the one or more files may be determined for storage, creating new key-value directory, populating an existing key-value directory, or a combination thereof. By way of example, the files are determined on receiving a request to perform one or more file operations (e.g., read, write, delete, close, etc.) from a host 107 or application 113. Other example operations include writing a new file, appending an existing file, truncating an existing file, or deleting an existing file. In one embodiment, the stream-based file store is a distributed key-value store that stores files as bytes or blocks of bytes in an unstructured format as key-value pairs. In one embodiment, virtual files are then defined by describing the start and end points of stored data streams.

In step 903, the key-value directory framework 101 causes, at least in part, a grouping of the one or more files into at least one key-value directory, wherein the key-value directory includes, at least in part, one or more key-value pairs of a distributed key-value store. It is noted that the key-value store for the key-value directory can be either the same key-value store for file storage or may be a different key-value store. In one embodiment, the grouping of the one or more files in the key-value directory constitutes a virtual file system that organizes the unstructured data (e.g., a collection of bytes) of the directories. In one embodiment, the key-value directory is a flat structure which contains files but no subdirectories. In other embodiments, it is contemplated that the key-value directory can include one or more subordinate key-value directories in combination with files.

In step 905, the key-value directory framework 101 causes, at least in part, a storage of at least one identifier of the one or more files, the at least one key-value directory, or a combination thereof as one or more keys of the one or more key-value pairs. In one embodiment, the key-value directory causes, at least in part, a concatenation of one or more names associated with the one or more files, the at least one key-value directory, the at least one stream-based file store, one or more delimiters, or a combination to generate the at least one identifier. The key-value directory framework 101 then causes, at least in part, a storage of block-based access information associated with the one or more files as one or more values of the key-value pairs (step 907). By way of example, block-based access information includes information on how each file is divided into blocks and how the blocks are addressed. In one embodiment, different files may have different block sizes, but the blocks within a single file are of the same size.

In step 909, the key-value store determines metadata associated with the one or more files. The metadata includes, for instance, filename information, update information, owner information, access rights information, or a combination thereof. In step 911, the key-value directory framework 101 causes, at least in part, a storage of the metadata in the one or more values of the key-value pairs associated with the one or more keys. In one embodiment, the metadata may include the block-access information (e.g., block sizes, block counts, etc.) discussed above.

Figure 10:
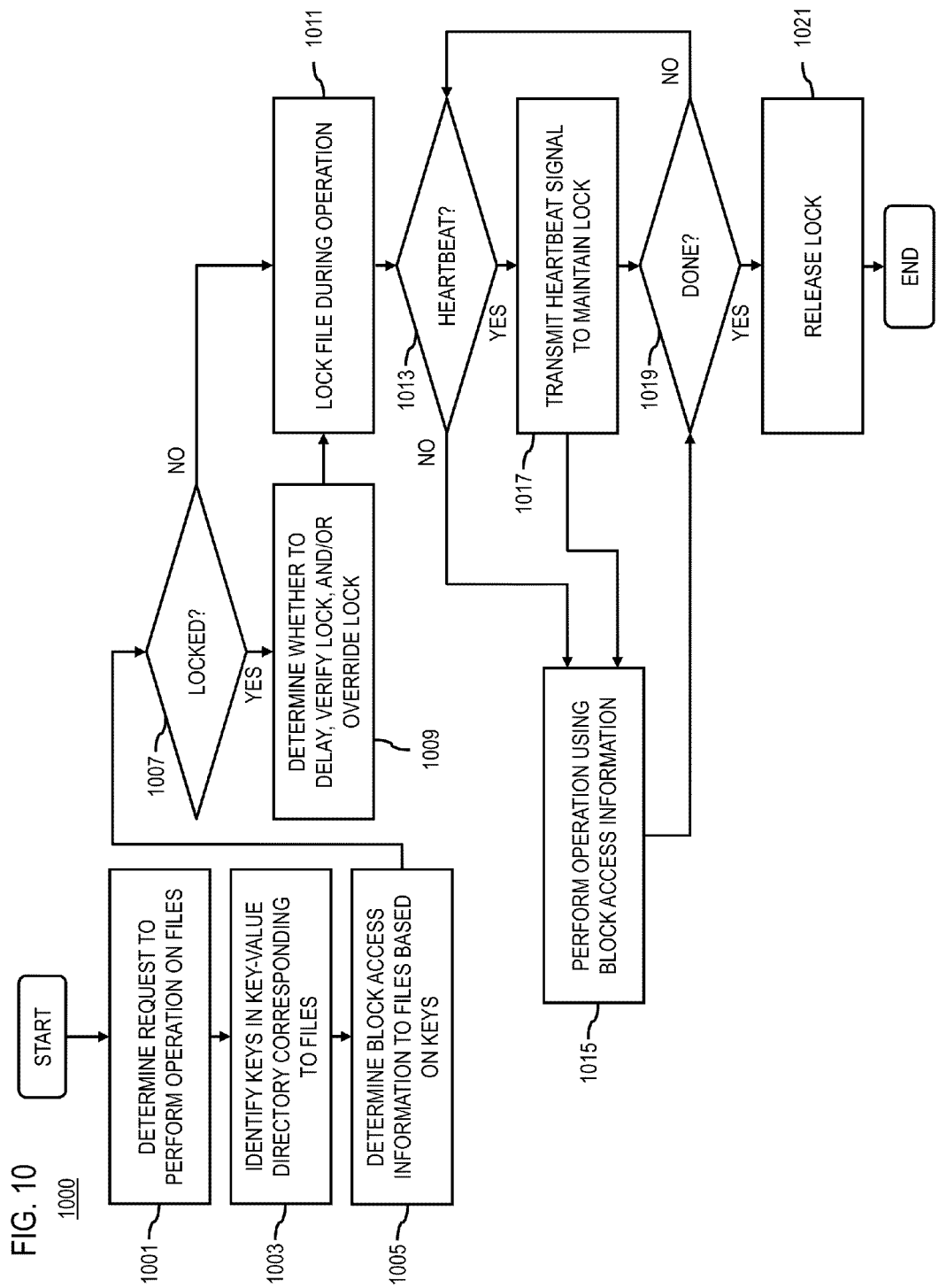
FIG. 10 is a flowchart of a process for responding to file operations via a key-value directory, according to one embodiment.

FIG. 10 is a flowchart of a process for responding to file operations via a key-value directory, according to one embodiment. In one embodiment, the key-value directory framework 101 performs the process 1000 and is implemented in, for instance, a chip set including a processor and a memory as shown FIG. 12. In step 1001, the key-value directory framework 101 determines a request specifying one or more operations (e.g., file operations) acting on one or more files associated with a key-value directory. The key-value directory framework 101 then processes and/or facilitates a processing of the request to identify at one or more keys in the key-value directory corresponding to the one or more files (step 1003). By way of example, process may include generating a key based on the file names and/or associated key-value directory according to a predetermined process and directly retrieving the generated key from the key-value store.

In step 1005, the key-value directory framework 101 can process and/or facilitate a processing of the block-based access information associated with the identified one or more keys to determine one or more pointers to the one or more files, to one or more locations within the one or more files, or combination thereof in the at least one stream-based file store for performing the one or more operations. In one embodiment, the block access information is based, at least in part, on block size information, block offset information, or a combination thereof associated with the one or more files.

Next, the key-value directory framework 101 determines whether the files or data blocks indicated by the block access information are locked (step 1007). It is noted that in some cases, certain operations (e.g., read operations) that can be performed concurrently without raising data integrity issues are performed without locking the blocks or files. If the key-value directory framework 101 determines that the one or more the one or more files, the one or more locations, or a combination thereof associated with the one or more pointers are in a locked state, the key-value directory framework 101 determines whether to delay the one or more operations, to verify the locking, to override the locking, or a combination thereof (step 1009). In one embodiment, the determination is made based, at least in part, on metadata associated with the locking. The metadata includes, at least in part, timestamp information, priority information, or a combination thereof for evaluating the validity of a lock.

After this determination or if the files, blocks, etc. are not locked, the key-value directory framework 101 causes, at least in part, a locking of the one or more files, the one or more locations, or a combination thereof associated with the one or more pointers (step 1011). In one embodiment, the locking is for at least a duration of a predetermined time period (e.g., 30 seconds), for performing the one or more operations (e.g., locked until the operation is determined to be completed), or a combination thereof.

In step 1013, the key-value directory framework 101 then determines whether a heartbeat signal is to be sent to maintain the lock for the performing the one or more operations. If a no heartbeat signal is to be sent, the key-value directory framework 101 causes, at least in part, an initiation or a performance of the one or more operations based, at least in part, on the determined block access information (step 1015). By way of example, the key-value directory framework 101 may transmit no heartbeat signal if it anticipates that it can complete the one or more operations within the lock duration or if the system 100 is configured to operation with no automatic lock expiration.

If a heartbeat signal is to be sent, the key-value directory framework 101 causes, at least in part, a transmission of a heartbeat signal to maintain the lock (step 1017). The key-value directory framework 101 then returns to step 1015 to perform or complete performance of the one or more operations. Periodically (e.g., before expiration of the lock), the key-value directory framework 101 determines whether the one or more operations have been completed (step 1019). If the operations are not done or completed, the key-value directory framework 101 returns to step 1015 to determine whether send another heartbeat signal to maintain the lock. On completion of the operation, the key-value directory framework 101 causes, at least in part, a release of the lock by for instance deleting the lock record or stamp from the metadata associated with the files, blocks, or key-value directory (step 1021).

The processes described herein for providing a key-value based storage interface may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
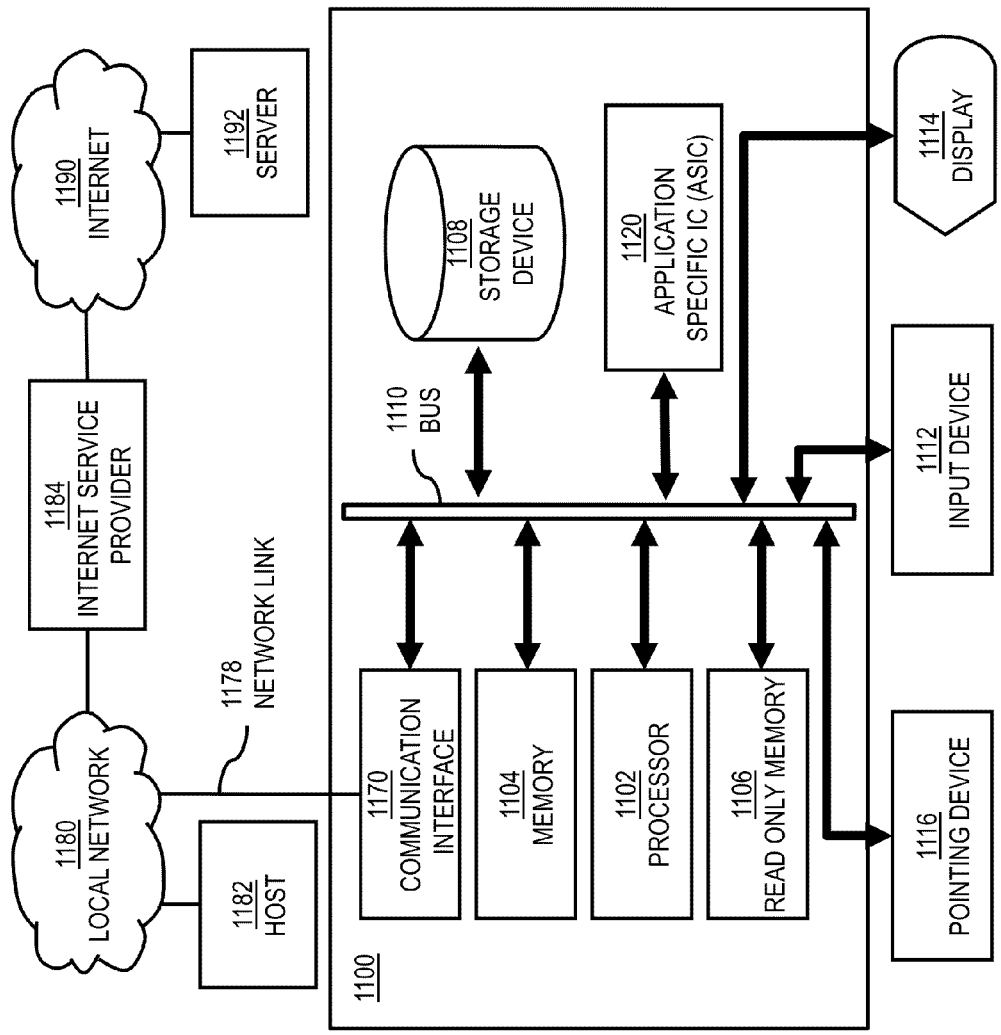
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide a key-value based storage interface as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing a key-value based storage interface.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing a key-value based storage interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing a key-value based storage interface. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing a key-value based storage interface, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 111 for providing a key-value based storage interface.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
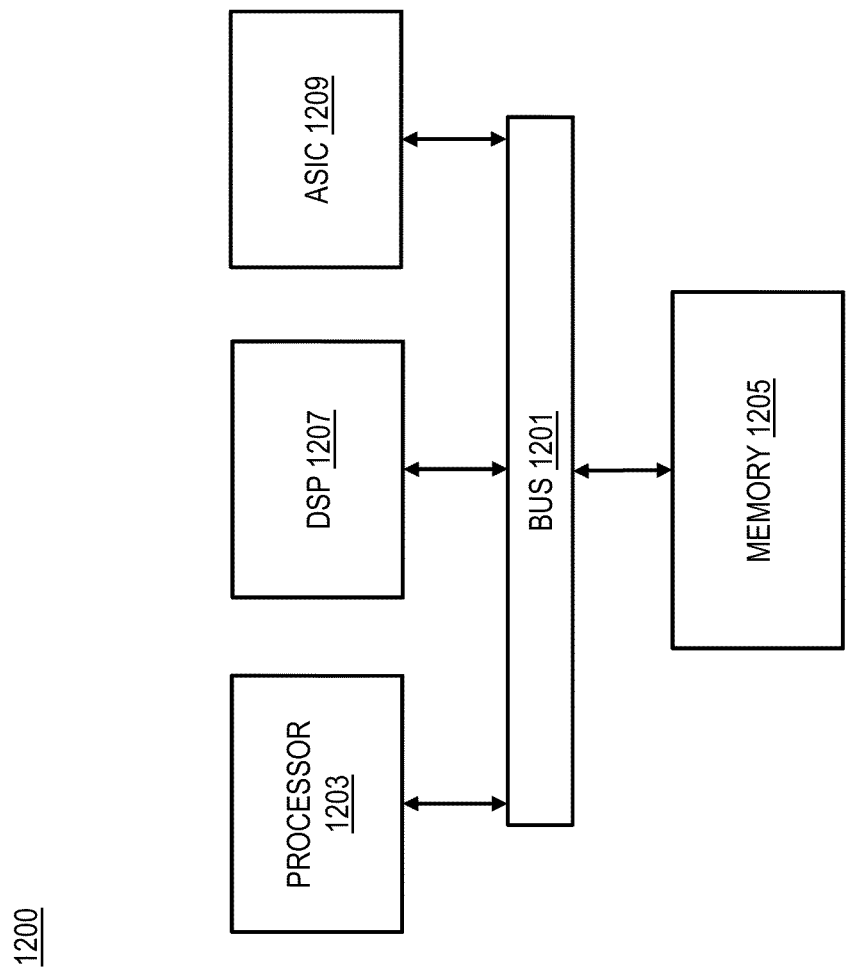
FIG. 12 is a diagram of a chip set that can be used to implement an embodiment of the invention.

FIG. 12 illustrates a chip set or chip 1200 upon which an embodiment of the invention may be implemented. Chip set 1200 is programmed to provide a key-value based storage interface as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing a key-value based storage interface.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a key-value based storage interface. The memory 1205 also stores the data associated with or generated by the execution of the inventive steps.

Figure 13:
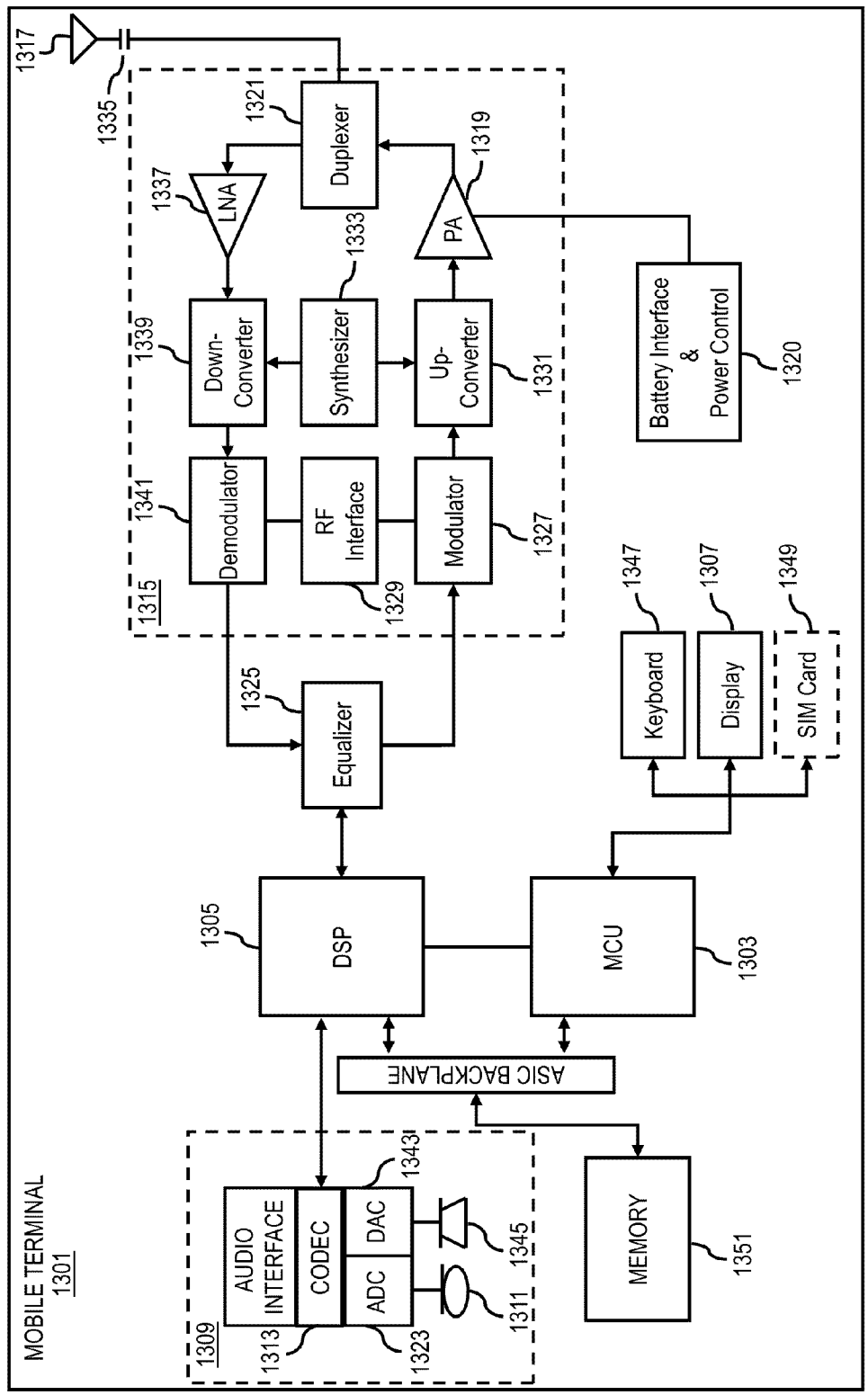
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing a key-value based storage interface. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing a key-value based storage interface. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to providing a key-value based storage interface. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   one or more files stored in at least one stream-based file store;
   a grouping of the one or more files into at least one key-value directory, wherein the key-value directory includes, at least in part, one or more key-value pairs of a distributed key-value store; and
   a storage of (a) at least one identifier of the one or more files, the at least one key-value directory, or a combination thereof as one or more keys of the one or more key-value pairs; and (b) block-based access information associated with the one or more files as one or more values of the key-value pairs.

2. A method of claim 1, wherein the (1) data and/or (2) information and/or (3) at least one signal are further based, at least in part, on the following:
   a processing of a request specifying one or more operations acting on the one or more files to identify at the one or more keys in the key-value directory corresponding to the one or more files; and
   a processing of the block-based access information associated with the identified one or more keys to determine one or more pointers to the one or more files, to one or more locations within the one or more files, or combination thereof in the at least one stream-based file store for performing the one or more operations.

3. A method of claim 2, wherein the (1) data and/or (2) information and/or (3) at least one signal are further based, at least in part, on the following:
   a locking of the one or more files, the one or more locations, or a combination thereof associated with the one or more pointers,
   wherein the locking is for at least a duration of a predetermined time period, for performing the one or more operations, or a combination thereof.

4. A method of claim 3, wherein the (1) data and/or (2) information and/or (3) at least one signal are further based, at least in part, on the following:
   a transmission of a heartbeat signal to maintain the lock.

5. A method of claim 2, wherein the (1) data and/or (2) information and/or (3) at least one signal are further based, at least in part, on the following:
   at least one determination that the one or more files, the one or more locations, or a combination thereof associated with the one or more pointers are in a locked state; and
   at least one determination to delay the one or more operations, to verify the locking, to override the locking, or a combination thereof.

6. A method of claim 5, wherein the (1) data and/or (2) information and/or (3) at least one signal are further based, at least in part, on the following:
   at least one determination of whether to delay, the one or more operations, to verify the locking, to override the locking, or a combination thereof based, at least in part, on metadata associated with the locking,
   wherein the metadata includes, at least in part, timestamp information, priority information, or a combination thereof.

7. A method of claim 1, wherein the (1) data and/or (2) information and/or (3) at least one signal are further based, at least in part, on the following:
   a concatenation of one or more names associated with the one or more files, the at least one key-value directory, the at least one stream-based file store, or a combination to generate the at least one identifier.

8. A method of claim 1, wherein the (1) data and/or (2) information and/or (3) at least one signal are further based, at least in part, on the following:
   metadata associated with the one or more files; and
   a storage of the metadata in the one or more values of the key-value pairs associated with the one or more keys.

9. A method of claim 8, wherein the metadata includes, at least in part, filename information, update information, owner information, access rights information, or a combination thereof.

10. A method of claim 1, wherein the at least one key-value directory includes one or more subordinate key-value directories.

11. An apparatus comprising:
    at least one processor; and
    at least one memory including computer program code for one or more programs, the at least one memory and the computer program code configured to, with the at least one processor, cause the apparatus to perform at least the following, determine one or more files stored in at least one stream-based file store;

cause, at least in part, a grouping of the one or more files into at least one key-value directory, wherein the key-value directory includes, at least in part, one or more key-value pairs of a distributed key-value store; and cause, at least in part, a storage of (a) at least one identifier of the one or more files, the at least one key-value directory, or a combination thereof as one or more keys of the one or more key-value pairs; and (b) block-based access information associated with the one or more files as one or more values of the key-value pairs.

12. An apparatus of claim 11, wherein the apparatus is further caused to:

process and/or facilitate a processing of a request specifying one or more operations acting on the one or more files to identify at the one or more keys in the key-value directory corresponding to the one or more files; and process and/or facilitate a processing of the block-based access information associated with the identified one or more keys to determine one or more pointers to the one or more files, to one or more locations within the one or more files, or combination thereof in the at least one stream-based file store for performing the one or more operations.

13. An apparatus of claim 12, wherein the apparatus is further caused to:

cause, at least in part, a locking of the one or more files, the one or more locations, or a combination thereof associated with the one or more pointers, wherein the locking is for at least a duration of a predetermined time period, for performing the one or more operations, or a combination thereof.

14. An apparatus of claim 13, wherein the apparatus is further caused to:

cause, at least in part, a transmission of a heartbeat signal to maintain the lock.

15. An apparatus of claim 12, wherein the apparatus is further caused to:

determine that the one or more files, the one or more locations, or a combination thereof associated with the one or more pointers are in a locked state; and determine to delay the one or more operations, to verify the locking, to override the locking, or a combination thereof.

16. An apparatus of claim 15, wherein the apparatus is further caused to:

determine whether to delay, the one or more operations, to verify the locking, to override the locking, or a combination thereof based, at least in part, on metadata associated with the locking, wherein the metadata includes, at least in part, timestamp information, priority information, or a combination thereof.

17. An apparatus of claim 11, wherein the apparatus is further caused to:

cause, at least in part, a concatenation of one or more names associated with the one or more files, the at least one key-value directory, the at least one stream-based file store, or a combination to generate the at least one identifier.

18. An apparatus of claim 11, wherein the apparatus is further caused to:

determine metadata associated with the one or more files; and cause, at least in part, a storage of the metadata in the one or more values of the key-value pairs associated with the one or more keys.

19. An apparatus of claim 18, wherein the metadata includes, at least in part, filename information, update information, owner information, access rights information, or a combination thereof.

20. An apparatus of claim 11, wherein the at least one key-value directory includes one or more subordinate key-value directories.

* * * * *